May 28, 1929. H. H. HUTCHINGS Re. 17,310

COMB

Original Filed May 10, 1927

WITNESSES

H. T. Walker

INVENTOR

Harry H. Hutchings

BY Munn & Co.

ATTORNEY

Reissued May 28, 1929. Re. 17,310

UNITED STATES PATENT OFFICE.

HARRY HENRY HUTCHINGS, OF NEW YORK, N. Y.

COMB.

Original No. 1,665,134, dated April 3, 1928, Serial No. 190,266, filed May 10, 1927. Application for reissue filed March 22, 1929. Serial No. 349,216.

My invention relates to a comb, and more particularly to a comb equipped with means adapted for the drying of hair by absorbing moisture in the hair when combed and adapted also to apply oil or hair tonic.

The general object of my invention is to provide a comb having embodied therein novel and effective means for performing the functions referred to.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1:
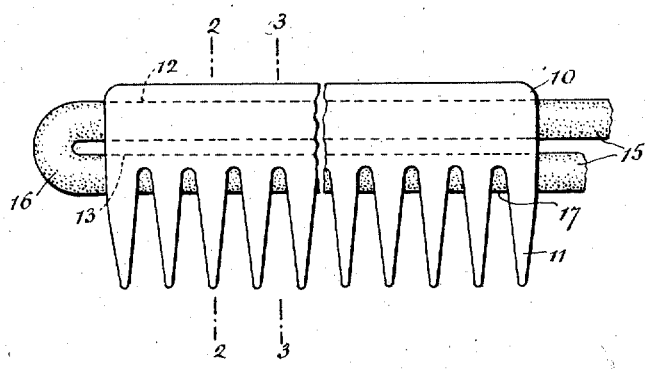
Figure 1 is a side elevation of a comb with my invention embodied therein.

In carrying out my invention in practice, the comb is formed with a back 10 and with teeth 11. In the back 10 is a longitudinal passage 12 to accommodate the running of an absorbent cord 15. The comb is further formed with a second longitudinal passage 13 adjacent the bases of the teeth.

Figure 2:
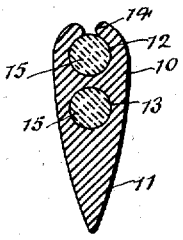
Fig. 2 is a cross section on the line 2—2 of Fig. 1.
Figure 3:
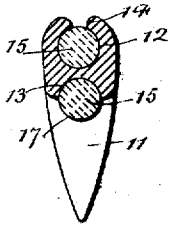
Fig. 3 is a cross section on the line 3—3 of Fig. 1.
Figure 4:
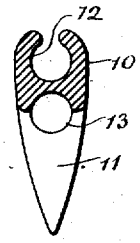
Fig. 4 is a section similar to Fig. 3 but omitting the absorbent element.

The passage 12 is produced in practice by forming a longitudinal groove in the back 10 and then, after the placing of a run of absorbent cord 15, bending over the material of the back 10 at the sides of the groove, as clearly shown in Figs. 2 to 4.

The passage 13 is formed by producing a groove partially in the back 10 and partially in the teeth 11, as best seen in Figs. 3 and 4. The absorbent cord 15 is run through the passage 12 and bent on itself, as at 16, and returned through the passage 13. The location of the passage 13 is such that the front run of the cord 15 will be exposed between the teeth 11, as indicated at 17.

If a dry cord 15 is employed, it will be clear that when the comb is used on the hair after washing, the moisture in the hair at the bases of the teeth will be absorbed by the exposed area 17. The cord 15 is longitudinally movable in both the passages 12 and 13. The exposed areas 17 may be renewed by a movement of the cord longitudinally of the comb.

From the foregoing specification it will readily be seen that the invention is neither confined to the use of the passage 12 or the particular configuration thereof as shown in the drawings, nor to the use of the invention with the specific cord 15 as described and shown. It will be understood that the essence of the present invention resides in the provision in a comb of a longitudinally extending passageway formed jointly through the bases of the teeth and through the back of the comb. The invention is not confined to the use with this passageway of any specific element, nor is the invention confined to the associated longitudinal passage 12 which lies thereabove and has access through the back of the comb to the outer edge thereof. The invention is further not confined to the specific length of the passageway shown and the same may be terminated short of the ends of the comb body if desired.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. As an article of manufacture, a comb having longitudinal passages therein, through which a cord may be run, one of said passages being partially in the back of the comb and partially in the teeth at the bases thereof, and a cord in said passages and exposed at the spaces between the teeth.

2. As an article of manufacture, a comb having a back and teeth formed with a groove partially in the back and partially in the teeth at the base thereof, together with an absorbent cord in said groove and lying partially in the back of the comb and partially exposed between the teeth.

3. As an article of manufacture, a comb having a longitudinal passage therein closed by the back of the comb and opening adjacent the back between the teeth of the comb.

4. As an article of manufacture, a comb having a longitudinal passage therein closed by the back of the comb and opening adjacent the back between the teeth of the comb, said passage having access through the ends of the comb.

HARRY H. HUTCHINGS.